(12) United States Patent
Heinz et al.

(10) Patent No.: US 6,168,228 B1
(45) Date of Patent: Jan. 2, 2001

(54) PASSENGER COMPARTMENT FOR A PASSENGER CAR

(75) Inventors: Martin Heinz, Stuttgart; Constantin Brin, Ditzingen; Franc Praznik, Leonberg; Rolf Remensperger, Mengen; Matthias Herntier, Wurmberg; Roberto Oggianu, Heilbronn, all of (DE)

(73) Assignee: Dr. Ing. h.c.F. Porsche AG, Weissach (DE)

( * ) Notice: Under 35 U.S.C. 154(b), the term of this patent shall be extended for 0 days.

(21) Appl. No.: 09/267,701

(22) Filed: Mar. 15, 1999

(30) Foreign Application Priority Data

Mar. 14, 1998 (DE) ............................................. 198 11 215

(51) Int. Cl.⁷ ................................................... B62D 27/02
(52) U.S. Cl. ..................... 296/188; 296/203.03; 296/204
(58) Field of Search ............................. 296/188, 203.03, 296/204, 205

(56) References Cited

U.S. PATENT DOCUMENTS 4,660,345 * 4/1987 Browning ......................... 296/205 X

FOREIGN PATENT DOCUMENTS

| 19603098 | | 3/1998 | (DE) . | |
|---|---|---|---|---|
| 22366 | * | 10 1896 | (GB) | ..................................... 296/205 |
| 406099851 | * | 4/1994 | (JP) | ................................. 296/203.03 |

* cited by examiner

*Primary Examiner*—Dennis H. Pedder
(74) *Attorney, Agent, or Firm*—Evenson, McKeown, Edwards & Lenahan, P.L.L.C.

(57) ABSTRACT

A passenger compartment for a passenger car has one B-column on each vehicle body side which leads into a side member situated below the B-column for increasing the transverse stiffness of the passenger compartment in the event of side impact loads. A transversely stiffening tube construction is composed of two laterally exterior upright reinforcing tubes and a tube-shaped stiffening element which extends over the width of the vehicle body. In order to achieve a more favorable introduction of force in the event of a side impact load, each upright reinforcing tube is linked to an adjoining connection plate with a lower edge area which is supported on the exterior side of the side member. An inwardly projecting supporting tube leads away from each reinforcing tube above the elevation of the side member. This supporting tube is rigidly connected in the area of the passenger compartment with one of the outer ends of the transversely extending, tube-shaped stiffening element.

12 Claims, 9 Drawing Sheets

PASSENGER COMPARTMENT FOR A PASSENGER CAR

This application claims the priority of German patent application No. 198 11 215.7, filed Mar. 14, 1998, the disclosure of which is expressly incorporated by reference herein.

BACKGROUND AND SUMMARY OF THE INVENTION

The present invention relates to a passenger compartment for a passenger car having one B-column on each vehicle body side which leads into a side member situated below for increasing the transverse stiffness of the passenger compartment in the event of side impact loads. A transversely extending tube construction is connected with the vehicle body and is composed of laterally exterior upright reinforcing tubes, and a tube-shaped stiffening element extends over the width of the vehicle body and is connected to the upright reinforcing tubes.

A passenger compartment of the initially mentioned type is known from German Patent Document DE 196 03 098 A1. In this known passenger compartment, an additional reinforcing tube is integrated in each B-column, and the two reinforcing tubes arranged in the B-columns are connected, approximately in the area of the elevation of the side members, with a stiffening element, which extends transversely along the vehicle body width and is linked to the vehicle body floor, to form a transversely stiffening tube construction.

This arrangement has the disadvantage that, because of the relatively low-situated, transversely extending stiffening element linked to the vehicle body floor and the relatively long upright lever arms of the reinforcing tubes, high moments occur in the event of a side impact load so that this tube construction must be dimensioned in a correspondingly stable manner, which increases the weight.

It is an object of the invention to further develop a tube reinforcement of the initially mentioned type such that, in the event of a side impact load, a more favorable introduction of force is achieved so that the tube construction can be made smaller and therefore with a lighter weight.

According to the invention, this object is achieved by a passenger compartment for a passenger car having one B-column on each vehicle body side, which leads into a side member situated below, for increasing the transverse stiffness of the passenger compartment in the event of side impact loads. A transversely stiffening tube construction, which is composed of two laterally exterior upright reinforcing tubes and a tube-shaped stiffening element extending over the width of the vehicle body, is provided. Additional advantageous characteristics of the invention are also claimed.

The principal advantages achieved by the invention are that, as a result of linking each upright reinforcing tube to an adjoining large-surface connection plate and supporting the lower edge area of the connection plate on the exterior side of the side member and the supporting tube, which extends from the reinforcing tube above the side member to the inside and is connected with the outer end of the tube-shaped stiffening element, a transversely stiffening tube construction is created at which, in the event of a side impact load, much more favorable lever ratios exist so that an optimized introduction of force and a significant increase of the transverse stiffness is achieved.

The transversely extending stiffening element is arranged along a significant partial area of its longitudinal course in a sunk manner in a transversely extending hollow member structure of the rear seat system or of the transmission tunnel and therefore requires no additional space. By the relatively highly situated transversely extending stiffening element, the laterally exterior, upright reinforcing tubes form short lever arms in the event of a side impact load. The connection plates cause a large-surface introduction of force in the event of a side impact load.

Preferably, each connection plate forms a prefabricated constructional unit with the upright reinforcing tube fastened thereto and the transversely extending supporting tube. The constructional unit is then connected within the passenger compartment with the free outer end of the stiffening element. Thus, compensation can be made for relatively large tolerances. Since the supporting tubes extend above the side members, the side members are not weakened. Below a central pulled-up section of the stiffening element, another tube element is integrated in a transmission bridge so that an effective force transmission also exists in the area of the transmission tunnel.

BRIEF DESCRIPTION OF THE DRAWINGS

Two embodiments of the invention are illustrated in the drawings and will be explained in detail in the following.

DESCRIPTION OF THE PREFERRED EMBODIMENTS

Figure 1:
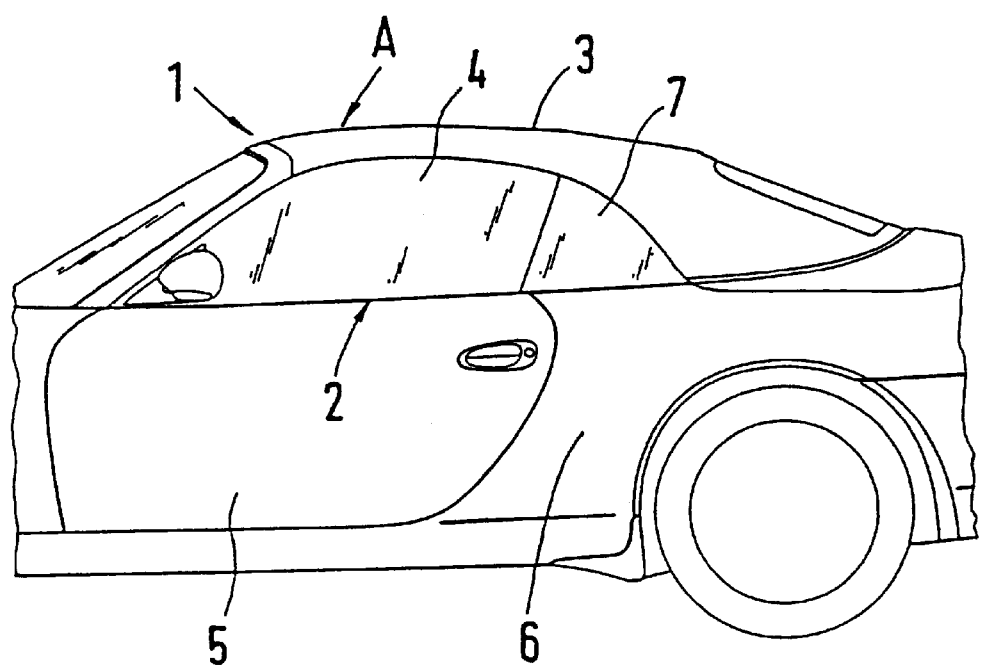
FIG. 1 is a partial lateral view of a motor vehicle formed by a convertible.

According to FIG. 1, a passenger car 1 is represented by a convertible which has, above the belt line 2, a folding top 3 which can be displaced from a closed position A into a folded-back rear-side deposited position.

The passenger car 1 comprises a side door 5 equipped with a vertically displaceable door window pane 4, the side door 5 being adjoined toward the rear by an outer side part 6. Adjacent to the door window pane 4, a rear window pane 7 is arranged which can be displaced from a closed position downward into a lowered position and vice versa.

A passenger compartment 8 of the passenger car 1 comprises a B-column 9 on each vehicle body side, whose lower end leads into a side member 10 situated below. In the convertible version, each B-column 9 is composed of a profiled outer part 9a and a profiled inner part 9b which, in areas, form the hollow member structure. The upper end of each B-column 9 ends below the rear side window 7 approximately at the level of the belt line 2 or slightly below it. A rear seat system 11, which is divided by a pulled-up transmission tunnel 12 into two individual seats situated side-by-side, extends between the two spaced B-columns 9.

The rear seat system 11 is connected at its forward, transversely extending end 13 by an upright heel-type plate 14 to the transmission tunnel 12 and to the vehicle floor 15 situated below. The vehicle floor 15 connects the two laterally exterior side members 10. In the upward direction, the rear seat system 11 is bounded on the vehicle body side by a seat recess 16 which adjoins the heel-type plate 14 in the front. For increasing the transverse stiffness of the passenger compartment 8 in the event of a side impact load, a transversely stiffening tube construction 17 is provided which is composed of two laterally exterior upright reinforcing tubes 18 and a tube-shaped stiffening element 19 which extends over the vehicle body width.

According to the invention, each upright reinforcing tube 18 is linked to an adjoining, relatively large-surface connection plate 20; this connection plate 20 ensures a large-surface introduction of force in the event of a side impact load.

A lower end area 21 of each connection plate 20 in sections surrounds the exterior side of the side member 10 and is fastened to it (for example, by welding). Thus, the lower end area 21 of each connection plate 20 is supported on the side member 10. Directly above the elevation of the side member 10, an inwardly projecting supporting tube 22 extends away from the upright reinforcing tube 18, which supporting tube 22, in the area of the passenger compartment 8, in each case is rigidly connected with the outer end 23 of the transversely extending tube-shaped stiffening element 19. The connection plate 20 forms a preassembled unit with the upright reinforcing member 18 fastened to it and with the transversely extending supporting tube 22.

According to the first embodiment, the connection plate 20 has, above the side member 10, an upright, outwardly open groove 24 into which the upright reinforcing tube 18 is fitted.

In this embodiment, the reinforcing tube 18 is formed by a hollow rectangular tube which is welded in sections to the connection plate 20. The rectangular tube is bevelled at the top and at the bottom. The exterior side of the rectangular tube is approximately aligned with the adjoining wall sections of the connection plate 20. In the connection area of the transversely extending supporting tube 22, the connection plate 20 has local cutouts. The exterior end of the supporting tube 22 is welded to the reinforcing tube 18. The connection plate 20 is disposed in front of the more inwardly arranged B-column 9 and extends at a small distance from the outer side part 6. In addition, when viewed in the vertical direction, the connection element 20 does not extend up to the belt line 2; instead, the connection element ends below the belt line and approximately at the level of the upper edge of a barrier.

Figure 2:
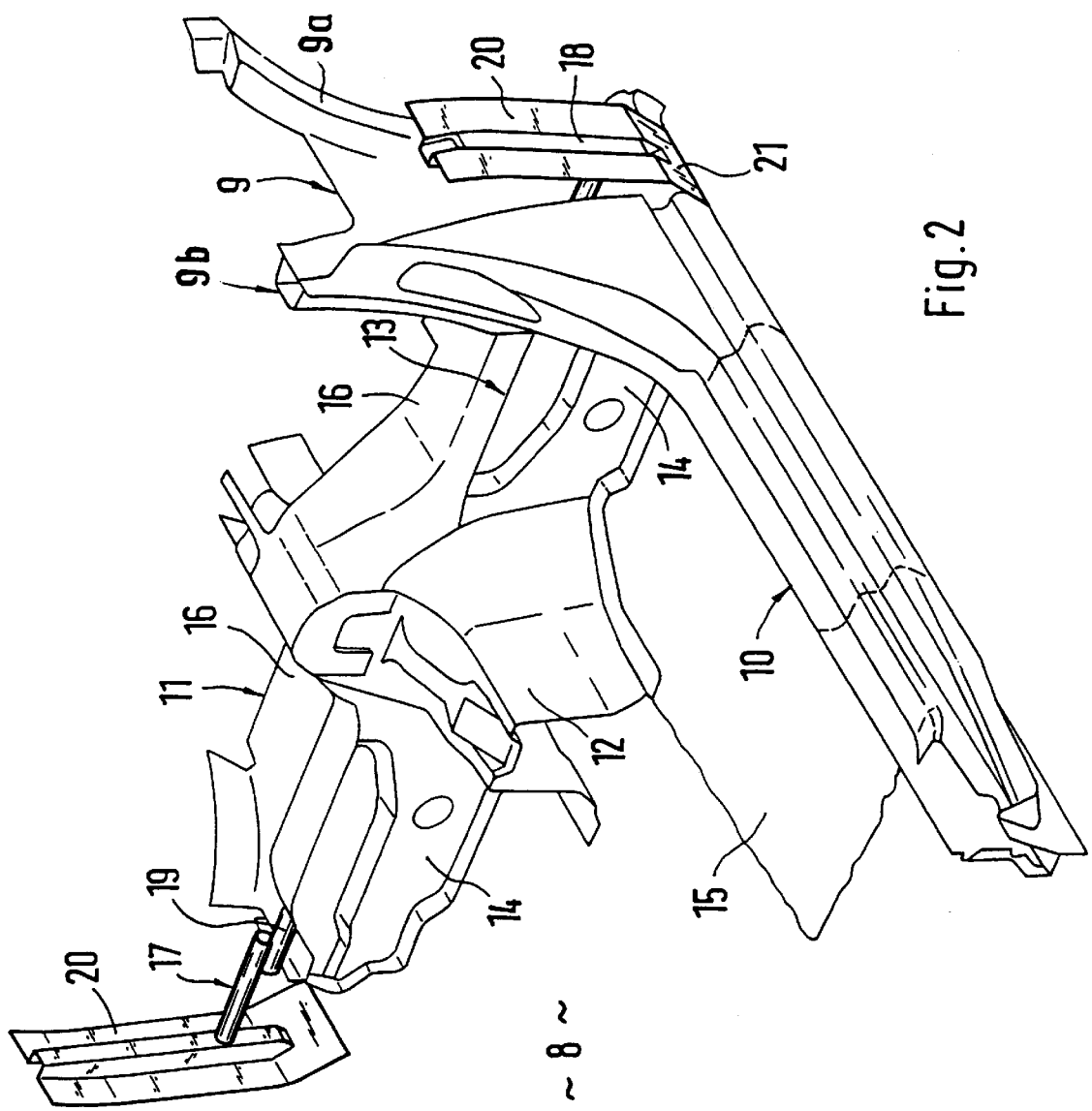
FIG. 2 is a perspective partial view, diagonally from the front of a side member, of an upright B-column and a partial area of the rear seat system of the passenger compartment as well as a first embodiment of a tube construction according to the invention.

According to FIG. 2, the supporting tubes 22 are formed by two short straight tubes which are aligned approximately horizontally and extend in the transverse direction of the vehicle. Both supporting tubes 22 extend in areas in the horizontal direction through the more inwardly situated B-column 9 and project beyond the respective B-column toward the interior.

The transversely extending tube-shaped stiffening element 19 is connected on its two outer ends either directly or by way of fitted-on connection links, which are not shown in detail, with the overlapping supporting tube 22 by welding. The stiffening element 19 is sunk in and extends along a significant portion of its transverse course in a transversely extending hollow space 25 of the rear seat system 11 and the transmission tunnel 12.

Figure 3:
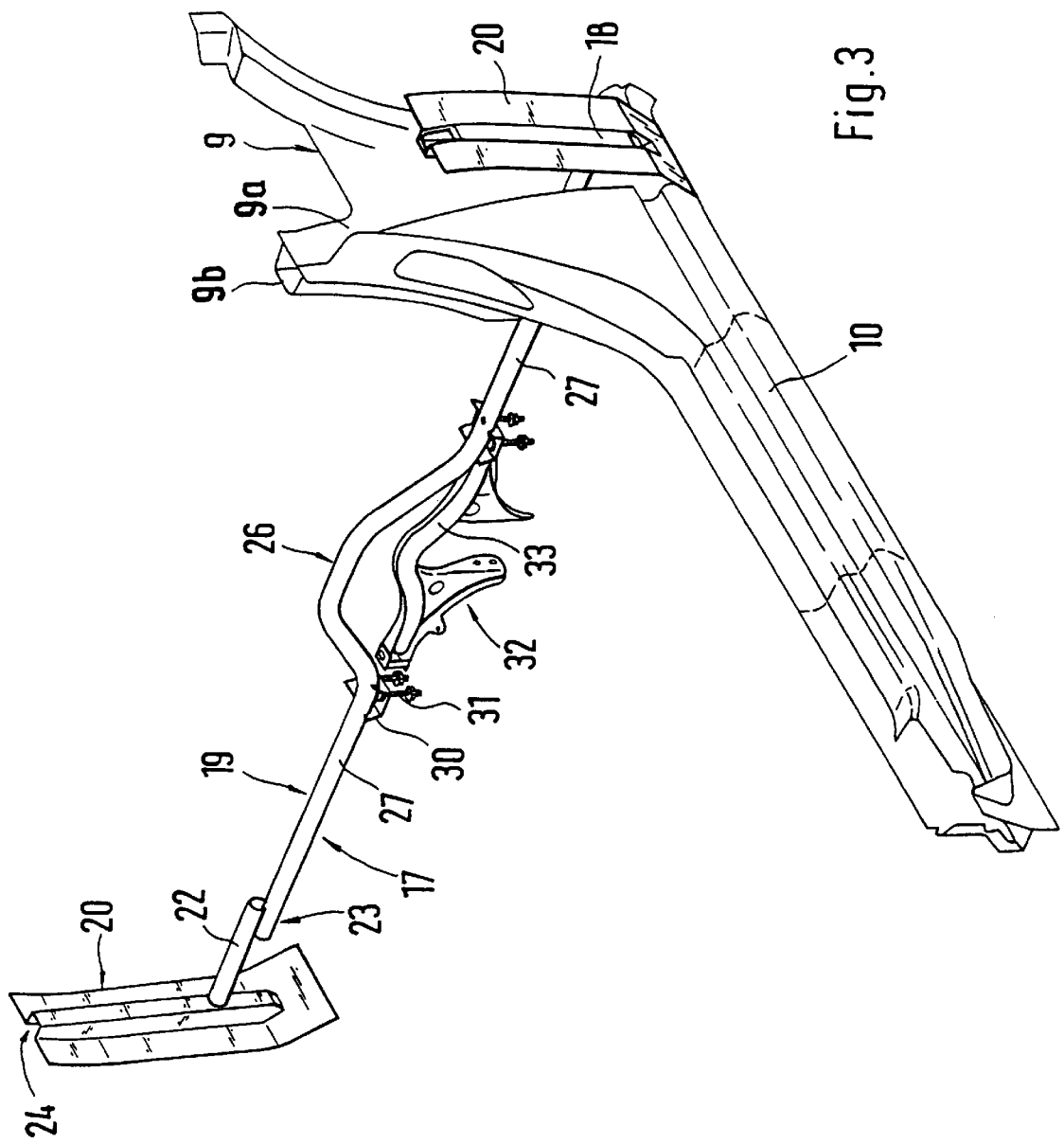
FIG. 3 is a perspective partial view of the components of the first embodiment of the tube construction as well as of a side member and the adjoining B-column.
Figure 4:
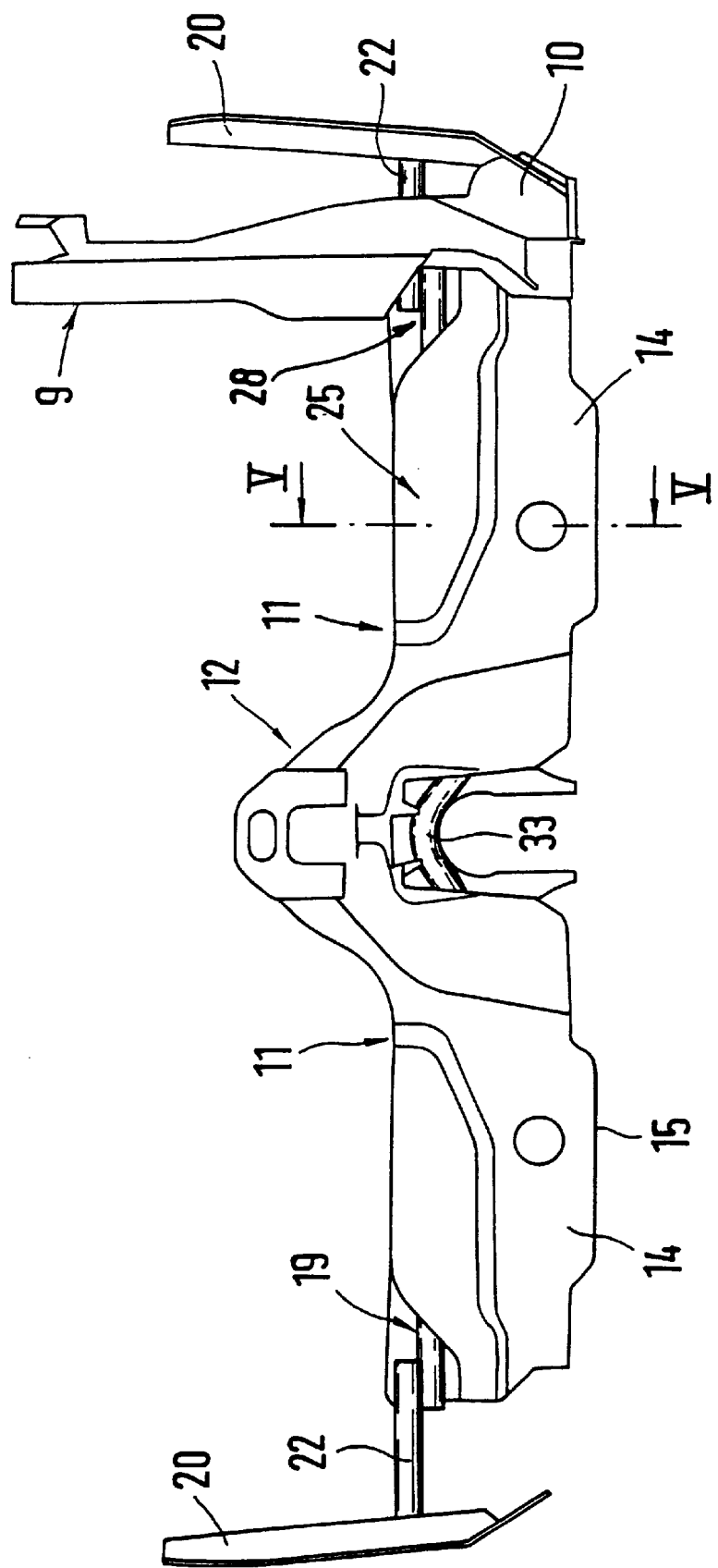
FIG. 4 is a frontal view of the tube construction and the adjoining vehicle body.

According to FIG. 3, the stiffening element 19 is composed of a central pulled-up section 26 and two transversely extending, approximately horizontal sections 27. The stiffening element 19 is freely accessible in the two outer connection areas 28.

Figure 5:
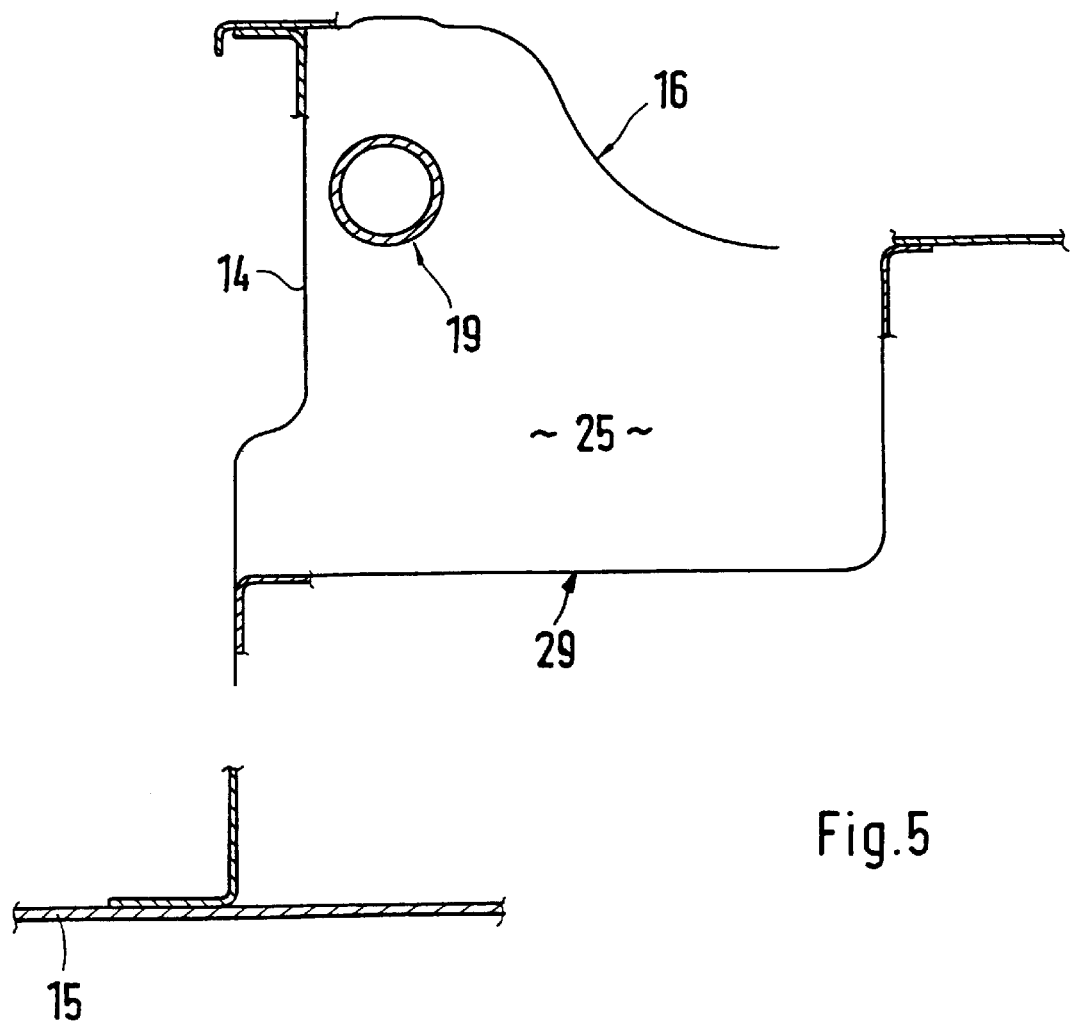
FIG. 5 is an enlarged sectional view along section line V—V of FIG. 4.
Figure 6:
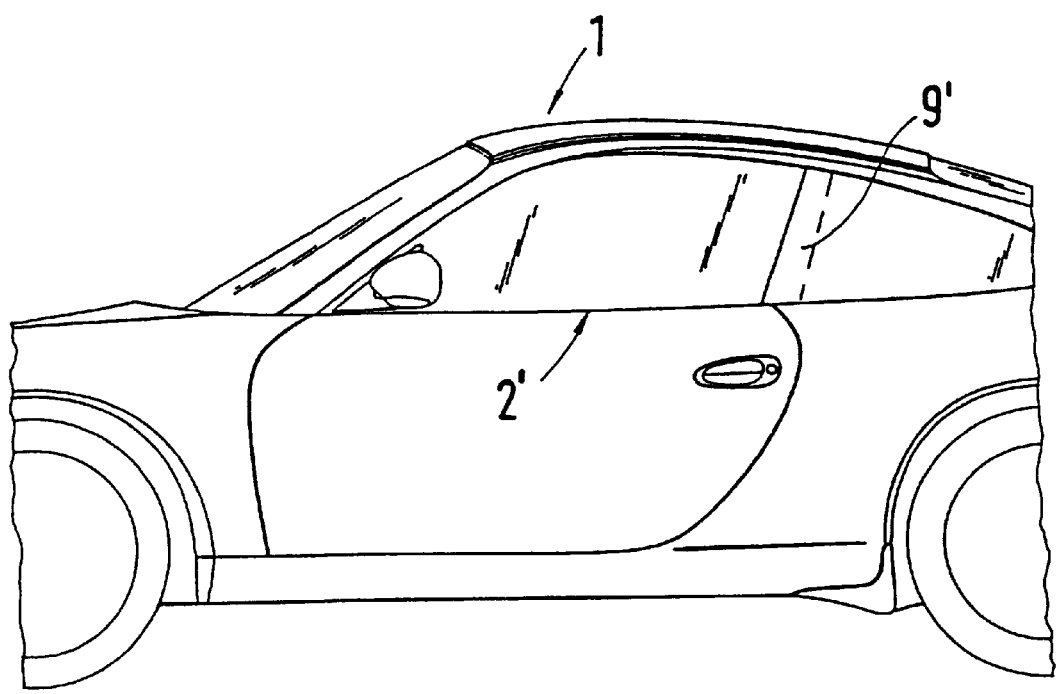
FIG. 6 is a partial lateral view of a motor vehicle formed by a coupe.
Figure 7:
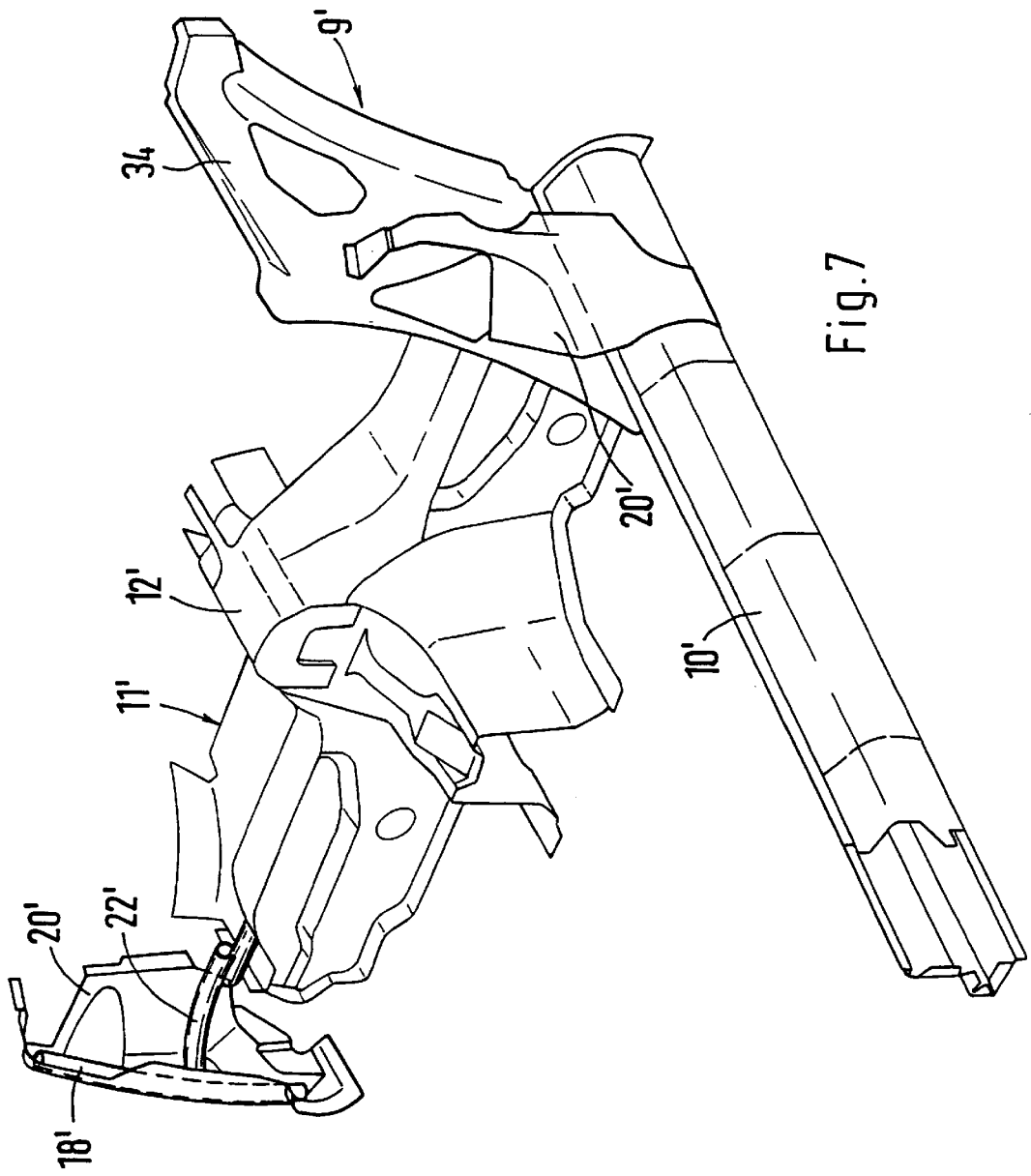
FIG. 7 is a perspective partial view of a second embodiment of a transversely stiffening tube construction and the adjoining vehicle body.
Figure 8:
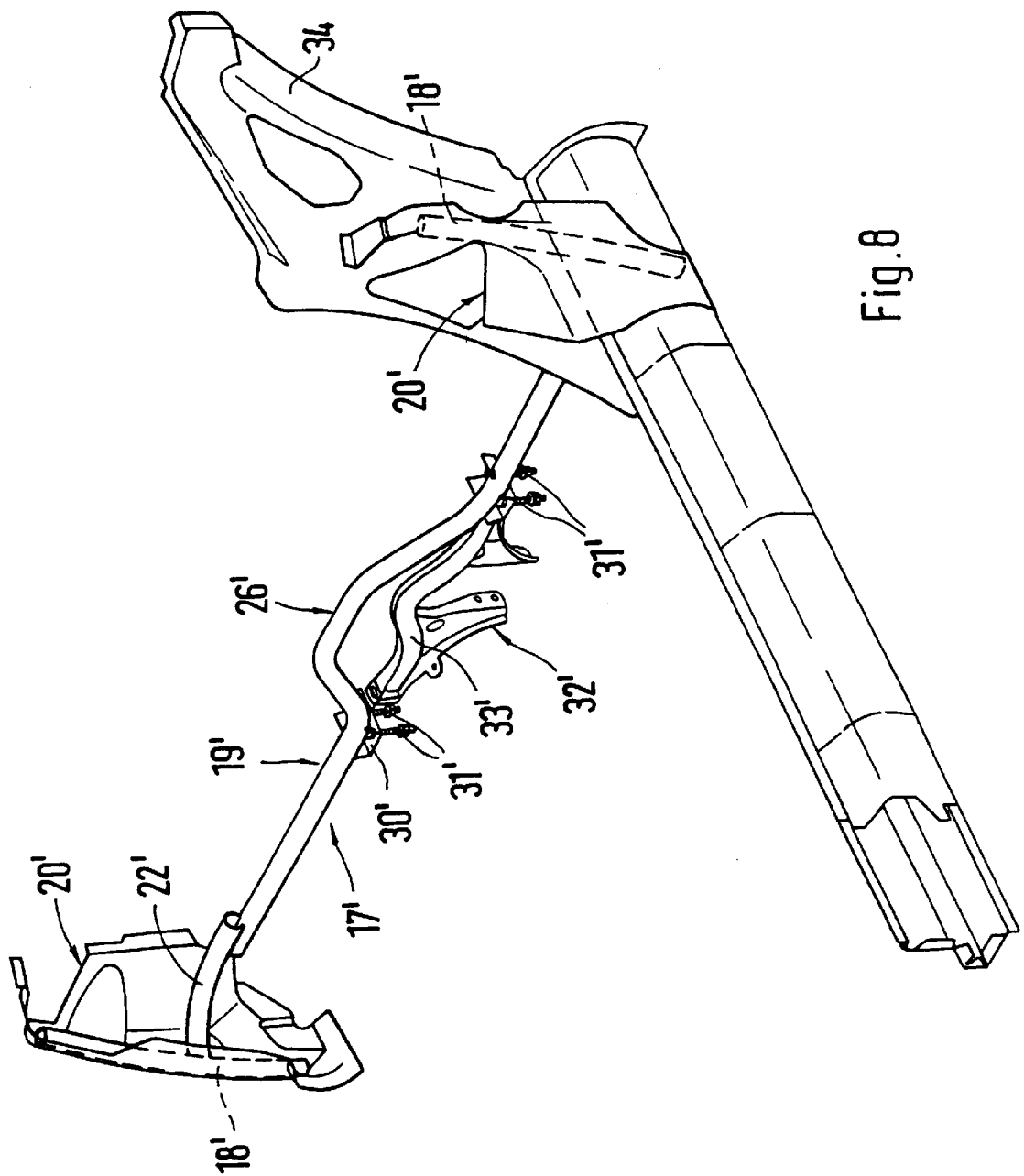
FIG. 8 is a perspective partial view of the second embodiment of the tube construction.
Figure 9:
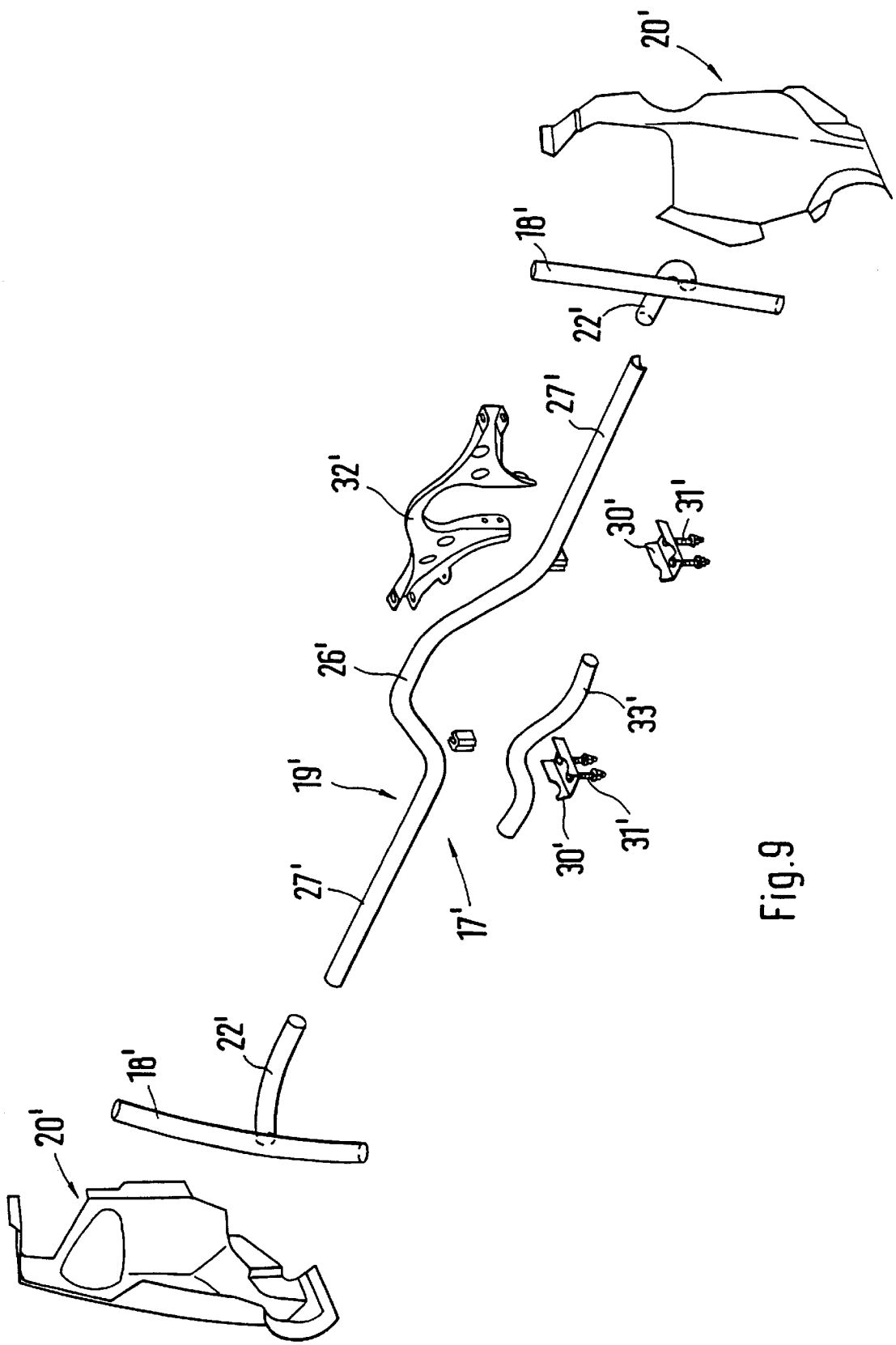
FIG. 9 is an exploded view of the components of the second embodiment of the tube construction.

The transversely extending hollow space 25 is formed in the area of the rear seat system 11 by the forward upright heel-type plate 14, the upper seat recess 16 and a lower edge plate 29 which is connected to the heel-type plate 14 and the underside of the seat recess 16 (FIG. 5).

On both sides of the pulled-up section 26, holders 30, having one or several downwardly projecting stud bolts 31, are welded to the underside of the transversely extending, horizontal sections 27 of the stiffening element 19 so that the stiffening element 19 can be screwed to the seat recess 16 of the rear seat system 11. Also, in the area of the transmission tunnel 12, the stiffening element 19 is sunk in and extends within a hollow space which is formed by the transmission tunnel 12 and a fitted on section of the seat recess 16.

To further stiffen the passenger compartment 8, an additional bent tube element 33 is integrated below the transmission tunnel 12 to a transversely extending transmission bridge 32. The additional tube element 33 further stiffens the transmission tunnel 12. The tube element 33 is fixedly connected with the upper edge of the transmission bridge 32. The transmission bridge 32 is fastened separately and away from the stiffening element 19 to the vehicle body.

In the first embodiment, the supporting tube 22 is situated above the stiffening element 19 and, in a top view, both components 19, 22 are in alignment. However, the two components 19, 22 may also extend at the same level and be arranged behind one another. The supporting tube 22 and the stiffening element 19 overlap one another in sections. For compensating tolerances, the connection of the supporting tube 22 with the stiffening element 19 takes place inside the passenger compartment 8 of the vehicle.

FIGS. 6 to 9 illustrate a transversely stiffening tube construction 17' for another embodiment of a passenger car, specifically a coupe version with a closed roof, in which, with the exception of the design of the B-column 9', the passenger compartment 8 is constructed identically to the first embodiment. In the coupe version, the B-column 9' has only a single web plate 34 which is pulled up from the side member 10' and which extends up to approximately the belt line 2'. An upright hollow-member construction extends above the belt line 2', and an upper edge of the construction is connected to the upper roof frame. The transversely stiffening tube construction 17' of the coupe version is identical to the convertible version in the area of the transversely extending stiffening element 19'.

In the coupe version, an upright, diagonally extending reinforcing tube 18' is surrounded by an outer connection plate 20', the reinforcing tube 18' being welded to the connection plate 20'. The connection plate 20', in sections, surrounds the exterior side of the side member 10' and is fixedly connected with it. Edge-side flanges of the connection plate 20' extend above the side member 10' by way of edge-side flanges to the outer contour of the upright web plate 34 and is welded to it. The connection plate 20' extends only in a lower partial area of the height of the B-column 9'.

From the interior reinforcing tube 18', a bow-shaped supporting tube 22' above the side member 10' extends toward the interior. The supporting tube 22' and the stiffening element 19' are connected with one another as in the initially described tube construction 17. In this embodiment, the supporting tube 22' is bent toward the front because the upright reinforcing tube 18', viewed in the longitudinal direction, is offset to the transversely extending stiffening element 19'.

Both tube constructions 17, 17' provide a clearly increased transverse stiffness of the passenger compartment 8, 8' and, in the event of a side impact load, the penetrating speed of the outer side of the vehicle into the passenger compartment 8, 8' is reduced.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Passenger compartment for a passenger car comprising:
   one B-column, respectively, on each side of a vehicle body,
   a side member, situated below each B-column, to which the B-column leads for increasing a transverse stiffness of the passenger compartment in the event of side impact loads,
   a transversely stiffening tube construction which is composed of two laterally exterior upright reinforcing tubes and a transversely extending tube-shaped stiffening element,
   an adjoining connection plate to which each upright reinforcing tube is linked and having a lower edge area supported on an exterior side of the side member, and
   an inwardly projecting supporting tube which extends from each reinforcing tube above the elevation of the side member, each supporting tube, in an area of the passenger compartment, being rigidly connected with the outer end of the transversely extending, tube-shaped stiffening element,
   wherein the stiffening element extends along a significant portion of its transverse course so that it is sunk in a transversely extending hollow space between a seat support and a floor plate.

2. Passenger compartment according to claim 1, wherein the stiffening element has a pulled-up section in an area of a transmission tunnel.

3. Passenger compartment according to claim 2, and further comprising holders on both sides of the pulled-up section of the stiffening element having upright, downwardly projecting stud bolts welded to an underside of the stiffening element.

4. Passenger compartment according to claim 2, and further comprising an integrated tube element provided on a transversely extending transmission bridge below the pulled-up section of the stiffening element.

5. Passenger compartment for a passenger car comprising:
   one B-column, respectively, on each side of a vehicle body,
   a side member, situated below each B-column, to which the B-column leads for increasing a transverse stiffness of the passenger compartment in the event of side impact loads,
   a transversely stiffening tube construction which is composed of two laterally exterior upright reinforcing tubes and a transversely extending tube-shaped stiffening element,
   an adjoining connection plate to which each upright reinforcing tube is linked and having a lower edge area supported on an exterior side of the side member, and
   an inwardly projecting supporting tube which extends from each reinforcing tube above the elevation of the side member, each supporting tube, in an area of the passenger compartment, being rigidly connected with the outer end of the transversely extending, tube-shaped stiffening element,
   wherein each upright reinforcing tube is welded to an interior side of one of the connection plates and said inwardly projecting supporting tube is an approximately horizontally extending, bent supporting tube which leads from the reinforcing tube to the transversely extending stiffening element which is situated farther rearward in the driving direction.

6. Passenger compartment according to claim 5, wherein each connection plate extends locally to an upright web plate of the B-column and is locally connected with it.

7. Passenger compartment for a passenger car comprising:
   one B-column, respectively, on each side of a vehicle body,
   a side member, situated below each B-column, to which the B-column leads for increasing a transverse stiffness of the passenger compartment in the event of side impact loads,
   a transversely stiffening tube construction which is composed of two laterally exterior upright reinforcing tubes and a transversely extending tube-shaped stiffening element,
   an adjoining connection plate to which each upright reinforcing tube is linked and having a lower edge area supported on an exterior side of the side member, and
   an inwardly projecting supporting tube which extends from each reinforcing tube above the elevation of the side member, each supporting tube, in an area of the passenger compartment, being rigidly connected with the outer end of the transversely extending, tube-shaped stiffening element,
   wherein each connection plate is constructed with an upright groove which has an approximately U-shaped profile and is open toward the outside, and wherein one of the upright reinforcing tubes is fitted into said upright groove and is fixedly connected with the connection plate.

8. Passenger compartment according to claim 7, wherein the upright reinforcing tube has one of rectangular and square cross-sections.

9. Passenger compartment for a passenger car comprising:
   one B-column, respectively, on each side of a vehicle body,
   a side member, situated below each B-column, to which the B-column leads for increasing a transverse stiffness of the passenger compartment in the event of side impact loads,
   a transversely stiffening tube construction which is composed of two laterally exterior upright reinforcing tubes and a transversely extending tube-shaped stiffening element,
   an adjoining connection plate to which each upright reinforcing tube is linked and having a lower edge area supported on an exterior side of the side member, and
   an inwardly projecting supporting tube which extends from each reinforcing tube above the elevation of the side member, each supporting tube, in an area of the passenger compartment, being rigidly connected with the outer end of the transversely extending, tube-shaped stiffening element, wherein each connection plate extends outside of one of the B-columns adjacent to a side part of the vehicle body, and wherein each transversely extending, horizontal supporting tube extends through the B-column which is situated farther inside.

10. Passenger compartment for a passenger car comprising:

a transversely extending stiffening element, upright reinforcing tubes located at opposite ends of the stiffening element, a connection plate to which each upright reinforcing tube is linked, side members on which lower edge areas of the connection plates and the upright reinforcing tubes are supported, and a supporting tube linking each side member with said transversely extending stiffening element, wherein the stiffening element extends along a significant portion of its transverse course so that it is sunk in a transversely extending hollow space between a seat support and a floor plate.

11. Passenger compartment according to claim 10, wherein the stiffening element has a pulled-up section in an area of a transmission tunnel.

12. Passenger compartment according to claim 11, and further comprising holders on both sides of the pulled-up section of the stiffening element having upright, downwardly projecting stud bolts welded to an underside of the stiffening element.

* * * * *